United States Patent [19]

Rasshofer et al.

[11] Patent Number: 4,732,960

[45] Date of Patent: Mar. 22, 1988

[54] PROCESS FOR THE PRODUCTION OF NEW POLYISOCYANATE COMPOSITIONS AND THEIR USE FOR THE PRODUCTION OF PLASTICS BY THE ISOCYANATE POLYADDITION PROCESS

[75] Inventors: Werner Rasshofer, Cologne; Reiner Paul, Mülheim/Ruhr; Joachim Probst, Leverkusen, all of Fed. Rep. of Germany

[73] Assignee: Bayer Aktiengesellschaft, Leverkusen, Fed. Rep. of Germany

[21] Appl. No.: 818,926

[22] Filed: Jan. 15, 1986

[30] Foreign Application Priority Data

Jan. 22, 1985 [DE] Fed. Rep. of Germany ....... 3501857

[51] Int. Cl.$^4$ .............................................. C08G 18/67
[52] U.S. Cl. ................................... 528/75; 264/45.4; 521/172; 525/328.8
[58] Field of Search ............... 525/328.8, 328.9, 75, 525/123, 124, 131; 521/172; 528/75; 264/45.4

[56] References Cited

U.S. PATENT DOCUMENTS

| | | | |
|---|---|---|---|
| 3,028,367 | 4/1962 | O'Brien | 528/75 |
| 3,284,415 | 11/1966 | Horvath | 525/123 |
| 3,376,252 | 4/1968 | Peiser et al. | 525/123 |
| 3,542,741 | 11/1970 | Hartmann et al. | 525/123 |
| 3,642,943 | 2/1972 | Noel | 528/75 |
| 4,065,410 | 12/1977 | Schafer et al. | 260/2.5 |
| 4,218,543 | 8/1980 | Weber et al. | 521/51 |

FOREIGN PATENT DOCUMENTS 43-9240  4/1968  Japan .
969114   9/1964  United Kingdom .

OTHER PUBLICATIONS

Kunststoffe, Jan. 1970, vol. 60, No. 1, Elastic Polyurethane Integral Foams by Dr. Hans Wirtz.

*Primary Examiner*—Veronica P. Hoke
*Attorney, Agent, or Firm*—Gene Harsh; Joseph C. Gil; Thomas W. Roy

[57] ABSTRACT

The present invention relates to a process for the production of polyisocyanate compositions containing urethane groups and having an isocyanate content of about 0.5 to 45% by weight by the reaction of (a) an organic polyisocyanate or mixtures thereof having an isocyanate content of about 30 to 50% by weight with (b) organic polyhydroxyl compounds using an equivalent ratio of isocyanate groups to hydroxyl groups of at least 1.8:1, characterized in that the polyhydroxyl compounds (b) are based on (b1) polyhydroxypolyacrylates having an average molecular weight, determined by vapor pressure osmometry, of 232 to about 100,000 which optionally contain urethane or ester groups in side chains, and a statistical average of at least one alcoholic hydroxyl group per molecule (b2) optionally in admixture with up to about 250% by weight, based on (b1), of other polyhydroxyl compounds in the molecular weight range of 62 to about 12,000.

The invention also relates to the polyisocyanate compositions obtainable by this process and their use as components for the production of polyurethanes or polyurethane ureas.

21 Claims, No Drawings

PROCESS FOR THE PRODUCTION OF NEW POLYISOCYANATE COMPOSITIONS AND THEIR USE FOR THE PRODUCTION OF PLASTICS BY THE ISOCYANATE POLYADDITION PROCESS

BACKGROUND OF THE INVENTION

1. Field of the Invention

This invention relates to a new process for the production of new polyisocyanate preparations substantially containing isocyanate semi-prepolymers based on organic polyisocyanates and certain polyhydroxypolyacrylates, the polyisocyanate preparations obtainable by this process and their use in the production of polyurethanes or polyurethane polyureas by the isocyanate polyaddition process, in particular the production of optionally cellular molded articles based on polyurethanes or polyurethane polyureas.

2. Description of the Prior Art

The production of molded bodies having a compact surface skin and a cellular core by the isocyanate polyaddition process is basically already known (see, e.g., Kunststoffe 60, pages 3 to 7 (1970) or DE-AS 1,196,864). With suitable choice of the starting components, this process can be used to produce both elastic and rigid molded articles. If little or no blowing agent is used in the process, the parts obtained are solid. The starting materials are preferably worked up by the so-called reaction injection molding process (RSG or RIM process). This is a technique of filling in which the liquid starting components are introduced into the mold within a very short time through so-called force controlled mixing heads. When producing parts for the automotive industry, for example, di- and/or trifunctional polyether polyols, in the molecular weight range of about 3000 to 7000, and low molecular weight diols such as ethylene glycol and/or butane-1,4-diol or aromatic diamines containing sterically hindered amino groups are reacted with polyisocyanates, preferably liquid polyisocyanates or polyisocyanate mixtures of the diphenylmethane series, optionally in the presence of blowing agents (see, e.g., U.S.-PS 4,218,543 or U.S.-PS 4,065,410). The molded parts obtained have excellent mechanical properties but it has been found that their surface occasionally is not completely free from pits and pores. Such surface defects can be revealed by rubbing a colored powder into the molded part, where they show up in a lighter color against a deep black (if graphite is used), intact surface due to a light scattering effect. These surface defects are often starting points for mechanical damage.

These surface defects in the form of pores or pits, also known as pin holes, must often be repaired by filling them with a repair or filling compound and then rubbing them down, in some cases before or after they have been degreased, and then covering the surface with a lacquer coat. The removal of such defects thus involves a considerable amount of labor.

It is an object of the present invention to provide novel polyisocyanate preparations which when used as all or part of the polyisocyanate component for the production of molded articles based on polyurethanes or polyurethane polyureas enables products to be produced without such surface defects, and the molded products obtained have excellent mechanical properties.

SUMMARY OF THE INVENTION

The present invention relates to a process for the production of polyisocyanate preparations containing urethane groups and having an isocyanate content of about 0.5 to 45% by weight by the reaction of
 (a) organic polyisocyanates having an isocyanate content of about 30 to 50% by weight or mixtures of organic polyisocyanates having an isocyanate content of about 30 to 50% by weight with
 (b) organic polyhydroxyl compounds using an equivalent ratio of isocyanate groups to hydroxyl groups of at least 1.8:1, characterized in that the polyhydroxyl compounds b) are based on
 (b1) polyhydroxypolyacrylates having an average molecular weight, determined by vapor pressure osmometry, of 232 to about 100,000 which optionally contain urethane or ester groups in side chains, and a statistical average of at least one alcoholic hydroxyl group per molecule,
 (b2) optionally in admixture with up to about 250% by weight, based on b1), of other polyhydroxyl compounds known in polyurethane chemistry in the molecular weight range of 62 to about 12,000.

The invention also relates to the polyisocyanate preparations obtainable by this process.

The invention further relates to the use of these polyisocyanate preparations as components for the production of polyurethanes or polyurethane ureas by the isocyanate polyaddition process.

DETAILED DESCRIPTION OF THE INVENTION

The production of urethane-modified polyisocyanate preparations, i.e. of prepolymers or semi-prepolymers containing terminal isocyanate groups, in particular those based on polyisocyanates or polyisocyanate mixtures of the diphenylmethane series (4,4-diisocyanatodiphenylmethane, mixtures thereof with 2,4'- and optionally 2,2'-diisocyanatodiphenylmethane or phosgenation products of aniline/formaldehyde condensates containing higher homologues of these diisocyanates in addition to the diisocyanates themselves) and of a wide variety of polyhydroxyl compounds is already known (see, e.g., EP-A 10,850 or 66,130; DE-OS 2,347,207, 2,404,166, 2,513,793, 2,513,796, 2,620,222, 2,622,104, 2,732,182, 2,737,338, 2,804,375, 2,810,596, 2,815,579 or 2,913,126; U.S.-PS 3,644,457, 4,055,548, 4,234,714 or 4,321,333, and GB-PS 1,369,334).

The processes disclosed in these prior publications generally have the object of liquefying diisocyanatodiphenylmethanes which are solid at room temperature, in particular 4,4'-diisocyanatodiphenylmethane, or reducing the tendency of polyisocyanate mixtures of the diphenylmethane series which are liquid at room temperature to crystallize when stored at low temperatures.

It has now surprisingly been found that urethane-modified polyisocyanate preparations of the type obtained by the process according to the invention which are based on any organic polyisocyanate, in particular aromatic polyisocyanates and most preferably on polyisocyanates or polyisocyanate mixtures of the diphenylmethane series not only constitute compositions which have a lowered melting point or reduced tendency to crystallization when stored at low temperatures, but also enable polyurethane plastics, in particular polyurethane molded bodies, to be produced with a homogeneous surface and excellent mechanical properties, in particular high resistance to bending or heat distortion, high rigidity and excellent green strength combined with high flexibility and elongation at break.

The starting materials a) used in the process according to the invention may be any organic polyisocyanate having an isocyanate content of about 30 to 50% by weight or any mixtures of such organic polyisocyanates having an isocyanate content of about 30 to 50% by weight.

The polyisocyanates used for the process according to the invention preferably have aromatically-bound isocyanate groups. These polyisocyanates include 2,4-diisocyanatotoluene; 2,6-diisocyanatotoluene; 1,ω-bis-(isocyanatophenyl)-alkanes such as 1,2-bis-(4-isocyanatophenyl)-ethane; alkyl substituted, in particular methyl substituted diisocyanatodiphenylmethane, for example, of the type described in EP-A 24,665 or 46,556; and in particular, polyisocyanates and polyisocyanate mixtures of the diphenylmethane series. Any mixtures of such polyisocyanates may also be used in the process according to the invention. The polyisocyanate mixtures of the diphenylmethane series, which are particularly preferred, include 4,4'-diisocyanatodiphenylmethane; mixtures thereof with 2,4'- and optionally 2,2'-diisocyanatodiphenylmethane in which the proportion of 2,4'-diisocyanatodiphenylmethane, based on the whole mixture, may be up to about 70% by weight and is preferably up to about 20% by weight, while the proportion of 2,2'-diisocyanatodiphenylmethane generally does not exceed 5% by weight; and polyisocyanates of the kind which may be obtained by the phosgenation of aniline/formaldehyde condensates and which may contain varying quantities of higher homologues of polyisocyanates (generally about 5 to 60% by weight, based on the whole mixture) in addition to diisocyanatodiphenylmethane isomers of the type mentioned above. The polyisocyanates used in the process according to the invention are preferably polyisocyanates or polyisocyanate mixtures of the diphenylmethane series as described above, optionally in admixture with up to 50 isocyanate equivalent percent, based on the total mixture, of other aromatic polyisocyanates. It is particularly preferred, however, to use the above-mentioned polyisocyanates or polyisocyanate mixtures of the diphenylmethane series as the only polyisocyanate components for the process according to the invention.

Starting component b) for the process according to the invention include b1) certain polyacrylate polyols of the type described in more detail below or mixtures of such polyacrylate polyols b1) with up to about 250% by weight, preferably up to about 100% by weight, of component b2), based on the weight of component b1), the component b2) being based on any polyhydroxyl compounds in the molecular weight range of 62 to about 12,000 of the kind known as starting materials for polyurethanes.

Component b1) includes compounds in the molecular weight range, determined by vapor pressure osmometry, of 232 to about 100,000, preferably about 1000 to 80,000, most preferably about 2000 to 50,000, with a hydroxyl group content of about 0.017 to 15% by weight, preferably about 0.1 to 10% by weight, most preferably about 0.5 to 5% by weight. The polyhydroxypolyacrylates used preferably have at least two alcoholic hydroxyl groups per molecule as a statistical average although it would in principle be possible to use the corresponding monohydroxyl compounds.

Polyhydroxypolyacrylates of this type are known and are prepared by known methods such as those described in EP-OS 68,383, DE-PS 2,460,329, GB-PS 1,515,868, U.S.-PS 3,002,959, U.S.-PS 3,375,227 or DE-AS 1,038,754.

They are generally prepared by the radical polymerization or copolymerization of a hydroxyalkyl ester of an unsaturated carboxylic acid, preferably acrylic or methacrylic acid, with itself or preferably together with other, hydroxyl-free, unsaturated monomers.

As already indicated above, all the molecular weights indicated for the polyacrylates containing hydroxyl groups are the number average molecular weights which may be determined, for example, by vapor pressure osmometry, and not the weight average molecular weights which may be determined, for example, by the light scattering method. The molecular weights of component b2) are calculated from the OH functionality and the hydroxyl group content with the exception of the higher functional polyester polyols which are also determined by vapor pressure osmometry.

Suitable hydroxyalkyl esters are in particular esters containing 2 to 8, preferably 2 to 4 carbon atoms in the alkyl group and obtained from α,β-unsaturated carboxylic acids having 3 to 5 carbon atoms, such as acrylic, methacrylic, fumaric, maleic, itaconic or crotonic acid. The acrylic and methacrylic acid esters are preferred. Hydroxyalkyl esters of the above-mentioned acids containing ether bridges in the alkyl group may also be used but are less preferred. The particularly preferred monomers with alcoholic hydroxyl groups include the 2-hydroxyethyl-, 2- and 3-hydroxypropyl-, and 2-, 3- and 4-hydroxybutyl-acrylates and -methacrylates. These monomers containing alcoholic hydroxyl groups may be prepared, for example, by the reaction of the above-mentioned acids with epoxides such as ethylene or propylene oxide.

The polyhydroxypolyacrylates which are used as component b1) may also be prepared by reacting the corresponding polyacrylates containing carboxylic acid groups with alkylene oxides such as propylene oxide and/or ethylene oxide in the presence of suitable alkoxylation catalysts such as e.g. tetrabutylammonium bromide. The starting materials for this alkoxylation reaction i.e. the polyacrylates containing carboxylic acid groups are obtained in known manner by copolymerisation of unsaturated carboxylic acids such as acrylic acid and/or methacrylic acid with unsaturated comonomers which do not contain carboxyl or hydroxyl groups of the type exemplified hereinbefore.

However, the preferred method of preparing the polyhydroxypolyacrylates consists in the copolymerisation of hydroxyalkylester of unsaturated carboxylic acids as set forth hereinbefore.

The comonomers used for the above-mentioned hydroxyl group-containing monomers may be any α,β-olefinically unsaturated compounds within the molecular weight range of 28 to 350 which are free from hydroxyl groups such as ethylene, propylene, butene-1, hexene-1, octene-1, styrene, α-methylstyrene, divinylbenzene, various isomeric vinyl toluenes, esters of α,β-unsaturated carboxylic acids of the type exemplified above with monohydric aliphatic alcohols having 1 to 18, preferably 1 to 10 carbon atoms, in particular the corresponding esters of acrylic or methacrylic acid such as the methyl, ethyl, n-butyl, n-pentyl, n-hexyl, 2-ethylhexyl or octadecyl ester of acrylic or methacrylic acid.

Neutral esters of polybasic carboxylic acids are also suitable comonomers, e.g. itaconic, crotonic, maleic or fumaric acid esters of the monohydric alcohols exemplified above.

Acrylic acid, methacrylic acid, vinyl acetate, acrylonitrile, methacrylonitrile and dienes such as isoprene or butadiene are also suitable comonomers. Vinyl chloride may in principle also be used as comonomer.

Particularly preferred starting materials b1) are the hydroxyalkylpolyacrylates obtained from about 10 to 50 parts by weight of a hydroxyalkyl ester of acrylic acid or methacrylic acid, 0 to about 80 parts by weight of styrene and/or α-methylstyrene, about 10 to 90 parts by weight of an acrylic and/or methacrylic acid ester free from hydroxyl groups, of the type exemplified above, and 0 to about 5 parts by weight of an αβ-unsaturated mono- or dicarboxylic acid of the type exemplified, in particular acrylic acid or methacrylic acid.

As already indicated above, the polyhydroxypolyacrylates preferably have at least two hydroxyl groups per molecule. Care should be taken, however, to ensure that their hydroxyl functionality is not so high that gelling of the reaction mixture takes place in the process according to the invention due to cross-linking reactions. The average hydroxyl functionality of the polyhydroxypolyacrylates should therefore generally not be greater than 5 and preferably not greater than 3 when the average molecular weight is below 1000; not greater than 25 and preferably not greater than 10 when the molecular weight is below 10,000 but above 1000; and not greater than 100, preferably not greater than 20 when the average molecular weight is above 10,000. When the polyhydroxypolyacrylates used have a comparatively high hydroxyl functionality within the range indicated above, it is necessary to use a large excess of isocyanate for the polyisocyanate preparations according to the invention in order to ensure that the aforesaid gelling of the reaction mixture due to cross-linking reactions cannot occur. If the hydroxyl functionality of any given polyhydroxypolyacrylate is found to be too high, it can easily be adapted to the given requirements by a suitable chemical reaction (for example by acylation, in particular acetylation of a proportion of the hydroxyl groups by reactions with acetic acid anhydride) or by urethanization of a portion of the hydroxyl groups (for example by a reaction with a monoisocyanate such as phenyl isocyanate or hexyl isocyanate). This method of controlling and if necessary reducing the hydroxyl functionality of the polyhydroxypolyacrylates is also particularly advantageous if component b) is composed mainly of polyhydroxypolyacrylates b1) and if the products obtained from the process according to the invention are to be used as the only or the main isocyanate component for the production of elastomeric polyurethanes or polyurethane polyureas. Otherwise, their functionality may be too high for the given purpose even if it is not so high as to cause gelling, the result being that the plastics products obtained are liable to be excessively cross-linked and brittle and in particular are liable to have insufficient tear propagation resistance.

Component b2) optionally used in the process according to the invention includes the known polyhydroxyl compounds of polyurethane chemistry, i.e. in particular polyhydroxyl compounds of the kind used according to the above-mentioned publications for modifying polyisocyanates of the diphenylmethane series. Suitable polyhydroxyl compounds b2), optionally used in combination with the polyhydroxyl compounds b1) which are essential for the process according to the invention, thus include simple glycols preferably containing ether groups and having (average) molecular weights of 62 to 700, e.g. ethylene glycol, 1,2-dihydroxypropane, 1,4-dihydroxybutane, polyethylene glycols and in particular polypropylene glycols within the above-mentioned molecular weight range or linear or branched polyether polyols within a molecular weight range of from 700 to about 12,000, preferably about 2000 to 6000, such as the alkoxylation products of suitable low molecular weight starter molecules, e.g. of the above-mentioned simple glycols or of suitable higher functional starter molecules such as glycerol or trimethylolpropane. The known polyester polyols of polyurethane chemistry having molecular weights, determined by vapor pressure osmometry, in the range of 700 to about 12,000, preferably about 2000 to 6000, which are obtainable by the known method of reacting organic carboxylic acids or carboxylic acid mixtures with excess quantities of organic hydroxyl compounds or mixtures of organic hydroxyl compounds are also suitable starting components b2). Examples of suitable carboxylic acids for the preparation of polyester polyols include in particular dicarboxylic acids such as adipic acid, phthalic acid, hexahydrophthalic acid or maleic acid or the anhydrides of these acids with the optional addition of small quantities of monofunctional carboxylic acids such as commercial or naturally occurring fatty acids or oleic acids or benzoic acid.

Examples of suitable polyhydric alcohols include the simple glycols mentioned above although higher functional alcohols such as glycerol, trimethylolpropane or pentaerythritol may also be used as all or a part of the polyhydric alcohol component. When preparing the polyester polyols, it is only necessary to ensure that the average carboxyl functionality and hydroxyl functionality of all the starting materials is at least 2 so that unwanted chain breaking does not occur during the preparation of the polyester polyols. Any mixtures of the compounds exemplified above as component b2) may, of course, also be used in the process according to the invention. Concerning the hydroxyl functionality of component b2), the comments made in connection with component b1) apply. The optional component b2) for the process according to the invention may be used in quantities of up to about 250% by weight, preferably up to about 100% by weight, based on the weight of component b1).

In one particular embodiment of the process according to the invention, component b), i.e. the mixture of components b1) and b2), is prepared in situ in such a manner that the polymerization reaction for forming component b1) takes place in component b2) as the reaction medium. Invert solvents may, of course, be included in this case as well as for the separate preparation of component b1).

The auxiliary agents and additives c) optionally used in the process according to the invention include in particular c1): isocyanate-inert polymers or copolymers of olefinically unsaturated monomers in the molecular weight range of about 200 to 50,000, preferably about 2000 to 30,000, as determined by vapor pressure osmometry, which are liquid at room temperature, soluble in or compatible with the reaction mixture and generally have a viscosity at 100° C. of about 1 to 200 Pa.s. These polymers or copolymers are substances or substance mixtures of the type described as component e1) in EP-OS 102,007 and component e) in U.S. Pat. No. 4,442,236. Soluble polystyrene compounds, however, may optionally also be included as component c1) in the process according to the invention.

The optionally used component c1) may be included in the process according to the invention in quantities of up to about 250% by weight, preferably up to about 100% by weight, based on the weight of component b1).

Other auxiliary agents and additives optionally used in the process according to the invention include c2): isocyanate-inert solvents such as toluene, n-hexane, n-heptane, petroleum hydrocarbon solvents, ethyl acetate, butyl acetate, ethylene glycol monomethyl ether acetate or ethylene glycol monoethyl ether acetate or any mixtures of such solvents.

These solvents may be used in quantities of up to about 200% by weight, based on the weight of component b1). If such solvents are used, they are preferably removed from the reaction mixture by distillation after the reaction according to the invention.

Other auxiliary agents and additives c) optionally used in the process according to the invention include c3): monohydric alcohols such as ethanol, n-hexanol, or n-dodecanol or, although these are less preferred, monobasic carboxylic acids such as benzoic acid or stearic acid. Such monofunctional compounds may be included to reduce the functionality of the starting materials if necessary to keep the degree of branching of the end products within limits. The same result could in principle be achieved by introducing monovalent isocyanates when conducting the process according to the invention, in which case they would also come under the heading of group c3). However, these monoisocyanates, if used at al, are preferably introduced at an earlier stage, i.e. by partial urethanization of the hydroxyl group of component b1) prior to carrying out the process of the invention. The addition of auxiliary agents and additives c3) exemplified above is less preferred. If, however, these auxiliary agents are to be used, the quantity to be added is preferably first approximately ascertained by a preliminary test.

The reactants for carrying out the process according to the invention are preferably used in the quantities corresponding to an equivalent ratio of isocyanate groups of component a) and optionally c3) to hydroxyl groups of component b) (sum of b1) and b2)) and optionally component c3) of at least 1.8:1, preferably from about 2:1 to 50:1.

The process according to the invention is generally carried out within the temperature range of about 20 to 140° C, preferably about 40 to 120° C. The reaction is generally carried out by adding the reactants together at room- temperature and then heating the reaction mixture to a temperature not exceeding 140° C., preferably about 40 to 100° C., until the calculated isocyanate content is reached.

The resulting polyisocyanate preparations containing urethane groups are generally so-called semi-prepolymers, i.e. mixtures of unreacted starting polyisocyanates with urethane-modified isocyanate prepolymers. It is only when low NCO:OH equivalent ratios are used within the above-mentioned range that the product obtained from the process according to the invention consists almost entirely of genuine isocyanate prepolymers containing only very small quantities of unreacted starting polyisocyanate. The isocyanate content of the products obtained from the process according to the invention depends on the nature and quantitative proportions of the starting materials, but lies within the limits indicated above.

When the preferred polyisocyanates or polyisocyanate mixtures of the diphenylmethane series are used, the reaction products obtained generally have an isocyanate content of about 0.5 to 45% by weight, preferably about 5 to 30% by weight, and most preferably about 18 to 28% by weight.

The products obtained from the process according to the invention generally have a lower melting point than the corresponding starting polyisocyanates. They may advantageously be used for the production of polyisocyanate polyaddition products, preferably polyurethane products, by a reaction with compounds containing isocyanate-reactive hydrogens, a portion of which are preferably hydroxyl groups. The polyisocyanates according to the invention may optionally be used in admixture with other polyisocyanates of the type known from polyurethane chemistry. It is particularly advantageous to use the products of the process according to the invention as the whole or part of the polyisocyanate component for the production of molded plastics by the reaction injection molding process, in particular both for the production of rigid, semi-rigid or soft integral foams and for the production of the corresponding solid or optionally microcellular molded articles having a gross density in the range of about 0.8 to 1.4 g/cm$^3$, preferably about 0.9 to 1.2 g/cm$^3$.

In this preferred use according to the invention, the products of the process according to the invention are used as the polyisocyanate component to be reacted with a "polyol component" by a one-shot reaction in known manner, optionally together with other polyisocyanates known in the art, the "polyol component" including at least one compound in the molecular weight range of 400 to about 12,000 which contains at least two isocyanate-reactive groups and optionally at least one compound in the molecular weight range of from 32 to 399 containing at least 2 and preferably 2 isocyanate-reactive groups and optionally also known auxiliary agents and additives used in polyurethane chemistry. The reaction is carried out by a method analogous to those described, for example, in U.S.-PS 4,218,543 or U.S.-PS 4,065,410.

The device according to the invention of using or including the products obtained by the process according to the invention as polyisocyanate component or as part of the polyisocyanate component results in molded articles which have an improved, i.e. more homogeneous surface than corresponding molded articles which have been produced without the inclusion of the products according to the invention. This is of great practical importance, especially if elastomeric molded bodies with a non-cellular outer skin are produced with the aid of the products according to the invention as the polyisocyanate component and used in known manner as car body parts or for the internal fittings of motor vehicles or for the manufacture of bicycle or motor bicycle saddles or coatings and sheet products.

The products obtained according to the invention may, of course, also be used for the production of other polyurethane products, for example the production of rigid, semi-rigid or flexible molded polyurethane materials obtained by foaming in open molds, for which they are advantageously used as the polyisocyanate component instead of or together with the polyisocyanates hitherto used for this purpose.

The polyurethanes produced with the aid of the products according to the invention are distinguished by their excellent mechanical properties. They may be used basically for the same applications as the state-of-the-art polyurethane plastics.

In the examples which follow, all the percentages given are percentages by weight and parts are parts by weight. The molecular weights were determined by vapor pressure osmometry.

EXAMPLES

Polyhydroxyl compounds defined as "polymers" are used in the following Examples. These are either pure polyhydroxypolyacrylates of the kind obtained from the copolymerization of the monomers indicated below (Polymers I, II, III and IV) or modification products of such copolymers (Polymers V and VI) or a mixture of a polyhydroxypolyacrylate and a polyester polyol prepared in situ in the presence of the polyester polyol (Polymer VII) or mixtures of simple polyhydroxypolyacrylates with separately prepared polyester polyols (Polymers VIII and IX). All of the percentages given for the hydroxyl group contents are based on the solids content.

The pure polyhydroxypolyacrylates II, III and IV were prepared from the monomers indicated below by the method of preparation used for Polymer I. Preparation of Polymer I 6.13 kg of xylene and 6.52 kg of ethyl glycol acetate (EGA) were introduced into an oxygen-free 40 l autoclave and heated to 140° C. A mixture of 2.0 kg of hydroxyethylmethacrylate, 8.3 kg of methylmethacrylate, 2.5 kg of 2-ethyl-hexylacrylate, 130 g of acrylic acid and 130 g of di-t-butylperoxide was added at a uniform rate at this temperature within a period of 4 hours with exclusion of air. 36 g of di-t-butylperoxide in 400 g of xylene were added for reactivation. The mixture was then stirred for about 7 hours at 140° C. and any residues of volatile monomers, in particular methyl methacrylate and small quantities of the solvent mixture were removed by distillation in a water jet vacuum. A 50% by weight solution of Polymer I in EGA/xylene (1:1) having a hydroxyl group content of 2.0% and an average molecular weight of 10,000 was obtained.

Polymer II (Preparation similar to that of Polymer I)

A copolymer of 50 parts of 2-hydroxypropylmethacrylate, 20 parts of styrene, 18 parts of methylmethacrylate, 6 parts of 2-ethylhexylacrylate and 1 part of acrylic acid. Average molecular weight: 1000; hydroxyl group content: 6.1%. Polymer II was in the form of a 60% solution in EGA/xylene (1:3).

Polymer III (Preparation similar to that of Polymer I)

A copolymer of 38 parts of 2-hydroxypropylmethacrylate, 20 parts of styrene, 22 parts of methylmethacrylate, 18 parts of n-butylacrylate and 2.0 parts of acrylic acid. Only xylene was used as solvent. Average molecular weight: about 700; hydroxyl group content: 4.4% (71% solution in xylene).

Polymer IV (Method of preparation similar to that of Polymer I)

A copolymer of 19 parts of 2-hydroxypropylmethacrylate, 49 parts of styrene, 2 parts of methylmethacrylate, 32 parts of n-butylacrylate and 2 parts of acrylic acid. Solvent: only solvent naphtha; 60% solution. Average molecular weight: about 2000; hydroxyl group content: 2.67%.

Preparation of Polymer V

A mixture of 5 kg of xylene and 1.25 kg of ethyl glycol acetate was introduced into an oxygen-free 40 l autoclave and heated to 140° C. with stirring. The following mixtures were added, in each case within 4 hours: a) a mixture of 3720 g of acrylic acid, 6000 g of styrene, 3000 g of methylmethacrylate and 1940 g of 2-ethylhexylacrylate, and b) a mixture of 600 g of di-t-butylperoxide and 4000 g of ethyl glycol acetate. The following were then added in rapid succession: c) a mixture of 100 g of ethyl glycol acetate and 30 g of di-t-butylperoxide followed by d) a mixture of 15 g of tetrabutylammonium bromide (catalyst for the propoxylation reaction) and 1500 g of ethyl glycol acetate. 3147 g of propylene oxide were then added within one hour, and finally 650 g of ethyl glycol acetate. The resulting reaction mixture was stirred for 6 hours at 140° C., and 0.5 l of solvent and residual monomers were then distilled off. A 60% solution of Polymer V in xylene/ethyl glycol acetate (proportions by weight =2:3) was obtained on cooling. The dissolved Polymer V had a hydroxyl group content of 5.2% (solid resin) and an average molecular weight of 2700.

Polymer VI (Method of preparation similar to that of Polymer V)

A copolymer of 25 parts of acrylic acid, 10 parts of methylmethacrylate, 30 parts of styrene and 9 parts of 2-ethyl-hexylacrylate, esterified with 22 parts of propylene oxide. Solvent: only EGA. Average molecular weight: 4000; hydroxyl group content: 6.0%. A 60% solution in EGA was obtained.

Preparation of Polymer VII

A mixture of 8.5 kg of xylene and 6.1 kg of a polyester polyol (MW 1800, OH number 170, an esterification product of 19 parts of 2-ethyl-hexanoic acid, 10 parts of phthalic acid anhydride, 20 parts of hexahydrophthalic acid and 10 parts of adipic acid with 42 parts of trimethylolpropane) was introduced into an oxygen-free 40 l autoclave and heated to 135° C. with stirring. A mixture of monomers containing 3537 g of 2-hydroxypropylmethacrylate, 5883 g of styrene, 988 g of 2-ethyl-hexylacrylate and 53 g of acrylic acid was added within 4 hours. A solution of 213 g of di-t-butylperoxide in 4 kg of xylene was added separately during the same period of time. After 4 hours, the reaction mixture was reactivated with a mixture of 667 g of xylene and 17 g of di-t-butylperoxide. The reaction mixture was finally stirred for a further 6 hours at 135° C. and 500 ml of toluene were then drawn off at reduced pressure and replaced by 500 ml of fresh xylene. A 51% solution of Polymer VII in xylene having a hydroxyl group content of about 4.6% was obtained.

Polymer VIII

A mixture of a polyhydroxypolyacrylate and a polyester polyol.

The polyester polyol was the reaction product of 20 parts of a commercial fatty acid mixture having an average molecular weight of 300, 20 parts of benzoic acid, 1.5 parts of maleic acid anhydride and 29.5 parts of phthalic acid anhydride with 14 parts of trimethylolpropane and 15 parts of pentaerythritol. The polyester polyol had an average molecular weight of 1200, a hydroxyl number of 200 and an acid number of 21.

The polyhydroxypolyacrylate was a copolymer which had been prepared by a method corresponding to that used for Polymer I from 10 parts of 2-hydroxypropylmethacrylate, 21 parts of styrene, 6 parts of n-butylacrylate and 0.5 parts of acrylic acid in the presence of 23 parts of xylene. The copolymer had a hydroxyl group content of 3.5%, based on the solids content. Polymer VIII was a mixture of the polyester polyol and polyhydroxypolyacrylate in proportions of 3:2.

Polymer IX

A mixture of a polyhydroxypolyacrylate and a polyester polyol. The polyacrylate and polyester polyol were mixed in proportions of about 3:2.

The polyester polyol was the reaction product of 28 parts of phthalic acid anhydride, 10 parts of adipic acid, 21parts of 2-ethyl-hexanoic acid and 2 parts of maleic acid with 39 parts of trimethylolpropane. The polyester polyol had an average molecular weight of about 1500 and a hydroxyl number of 165.

The polyhydroxypolyacrylate was a copolymer prepared by the method used for Polymer I from 19 parts of 2-hydroxyethylmethacrylate, 24 parts of styrene, 15 parts of n-butylacrylate and 0.5 parts of acrylic acid. Preparation of the copolymer was carried out in thee presence of 24 parts of a mixture of xylene and ethyl glycol acetate (proportions by weight =2:1). The copolymer had a hydroxyl group content of 4.2%, based on the solids content, and an average molecular weight of 1500.

EXAMPLE 1

94.5 g of a 51% solution of Polymer VII in xylene and 400 g of a polyisocyanate mixture of the diphenylmethane series containing 83% of 4,4'-diisocyanatodiphenylmethane, 7% of 2,4'-diisocyanatodiphenylmethane and 10% of higher functional polyisocyanates (isocyanate content of the mixture: 32.2%) were stirred for 4 hours at 80° C. and then freed from solvent by distillation at 100° C./1.3 mbar.

The product obtained was a low viscosity isocyanate semi-prepolymer having an isocyanate content of 26.2%, a viscosity at 25° C. of 289 mPas and a solidification range of −15° C. to −10° C. The gas chromatographically determined residual xylene content was 0.039%.

EXAMPLE 2

72 g of a 60% solution of Polymer II in a solvent mixture of ethyl glycol acetate and xylene (proportions by weight =1:3) were mixed with 400 g of the polyisocyanate mixture mentioned in Example 1 and the mixture was stirred for 4 hours at 80° C. The solvent was then removed by distillation at 100° C./1.3 mbar.

A low viscosity isocyanate semi-prepolymer having an isocyanate content of 26%, a viscosity at 25° C. of 260 mPas, a solidification point of about −8° C. and a residual solvent content of 0.35% was obtained.

EXAMPLE 3

72 g of a 60% solution of Polymer VI in ethyl glycol acetate were mixed with 400 g of the polyisocyanate mixture used in Example 1 and stirred for 4 hours at 80° C. The solvent was distilled off at 100° C./1.3 mbar.

A low viscosity isocyanate semi-prepolymer having an isocyanate content of 26.6%, a viscosity at 25° C. of 350 mPas, a solidification point of about −10° C. and a gas chromatographically determined residual ethyl glycol acetate content of 1.28% was obtained.

EXAMPLE 4

74 g of a 71% solution of Polymer III in xylene were mixed with 400 g of the polyisocyanate mixture used in Example 1 and stirred for 4 hours at 80° C. The solvent was then distilled off at 100° C./1.3 mbar.

A low viscosity isocyanate semi-prepolymer having an isocyanate content of 25.9%, a viscosity at 25° C. of 410 mPas, a solidification point of about −14° C. and a gas chromatographically determined residual xylene content of 0.01% was obtained.

EXAMPLE 5

80 g of a 60% solution of Polymer V in xylene/ethyl glycol acetate, (2:3) and 400 g of the polyisocyanate mixture mentioned in Example 1 were mixed together and stirred for 4 hours at 80° C. The solvent was distilled off at 100° C./1.3 mbar.

A low viscosity isocyanate semi-prepolymer having an isocyanate content of 25.9%, a viscosity at 25° C. of 336 mPas, a solidification point of -17° C. and a residual solvent content of 0.78% was obtained.

EXAMPLE 6

1000 g of a 60% solution of Polymer IV in solvent naphtha 100 (aromatic hydrocarbon solvent mixture) and 4000 g of the polyisocyanate mixture mentioned in Example 1 were combined and stirred for 4 hours at 80° C. The solvent was distilled off at 100° C./1.3 mbar.

A low viscosity isocyanate semi-prepolymer having an isocyanate content of 26.2%, a viscosity at 25° C. of 260 mPas, a solidification point of −17° C. and a gas chromatographically determined solids content of solvent naphtha 100 of 5.11% was obtained.

EXAMPLE 7

104 g of a 60% solution of Polymer VIII in xylene were mixed with 400 g of the polyisocyanate mentioned in Example 1 and stirred for 4 hours at 80° C. The solvent was then distilled off at 100° C./1.3 mbar.

A low viscosity isocyanate semi-prepolymer having an isocyanate content of 25.4%, a viscosity at 25° C. of 382 mPas, a solidification point of about −7° C. and a gas chromatographically determined residual xylene content of 0.16% was obtained as residue.

EXAMPLE 8

100 g of a 60% solution of Polymer IX in a 2:1 mixture of xylene and ethyl glycol acetate was mixed with 400 g of the polyisocyanate mixture mentioned in Example 1 and stirred, for 4 hours at 80° C. The solvent was then distilled off (100° C./1.3 mbar).

A low viscosity isocyanate semi-prepolymer was obtained having an isocyanate content of 23.6%, a solidification point of −11° C., a viscosity at 25° C. of 510 mPas and a gas chromatographically determined xylene residue of 0.059% and ethyl glycol acetate residue of 0.73%.

EXAMPLE 9

2870 g of a 50% by weight solution of Polymer I in EGA/xylene 1:1 were combined with 8151 g of the polyisocyanate mixture mentioned in Example 1 and stirred for 3 hours at 80° C.

After removal of the solvent by distillation (90° C./1.3 mbar), a low viscosity isocyanate semi-prepolymer was obtained having an isocyanate group content of 22.9%, a viscosity at 25° C. of 518 mPas, a solidification point at about 10° C. and a gas chromatographically determined xylene residue of 0.054% and butyl acetate residue of 0.28%.

EXAMPLE 10

167 g of the 60% solution of Polymer IV in solvent naphtha were combined with 351 g of isophorone diisocyanate and the mixture was stirred for 4 hours at 80° C.

After removal of the xylene by distillation at 80° C./1 Torr, a colorless, medium viscosity isocyanate semi-prepolymer having an isocyanate content of 27.6%, a viscosity at 25° C. of 2500 mPas, a solidification point of −13° C. and a gas chromatographically determined residual solvent naphtha content of 0.75% was obtained.

EXAMPLE 11

250 g of the solution of Polymer IV mentioned in Example 10 were combined with 291 g of 4,4'-diisocyanatodiphenylmethane and stirred for 4 hours at 40° C.

After removal of the solvent by distillation at 100° C./1 Torr, a highly viscous isocyanate semi-prepolymer which was only just fluid at room temperature was obtained. This semi-prepolymer had an isocyanate content of 19.2%, a solidification point of 19° C., a viscosity at 25° C. of 24,200 mPas and a gas chromatographically determined residual solvent naptha content of 0.63%.

EXAMPLE 12 (EXAMPLE OF USE)

| Formulation: | | |
|---|---|---|
| 1. | 190 | parts of a polyether with OH number 27 prepared by the propoxylation of trimethylolpropane followed by ethoxylation of the propoxylation product (proportions by weight PO:EO = 78:22) |
| 2. | 47 | parts of ethylene glycol |
| 3. | 15 | parts of dichloromethane |
| 4. | 0.15 | parts of a commercial tin catalyst (Ul 1 of Witco Co.) |
| 5. | 0.2 | parts of triethylene diamine |
| 6. | 266 | parts of a mixture of (i) 90 parts of an isocyanate prepolymer having an isocyanate content of 24.5% obtained from the polyisocyanate mixture described in Example 1 and dipropylene glycol and (ii) 10 parts of the semi-prepolymer according to Example 7. |

Components 1 to 5 were combined to form a "polyol component" which was mechanically mixed for 9 seconds with the polyisocyanate component mentioned under 6. The raw materials were at a temperature of 25° C. The mixture was injected mechanically into a steel mold heated to 60° C. which had the internal dimensions 20 ×20 ×1 cm, and the mixture was left to harden in the mold. The internal walls of the closed mold had previously been coated with a wax based external mold release agent (mold release agent P 180 of Acmos).

After a mold standing time of 180 seconds, molded products having a Shore D hardness of 63, very high green strength and a smooth, glossy surface was removed from the mold.

EXAMPLE 13 (Example of use)

| Formulation: | | |
|---|---|---|
| 1. | 188 | parts of a polyether as described in Example 12 |
| 2. | 46 | parts of ethylene glycol |
| 3. | 15 | parts of dichloromethane |
| 4. | 0.15 | parts of tin catalyst as in Example 12 |
| 5. | 0.2 | parts of triethylene diamine |
| 6. | 135.2 | parts of an isocyanate prepolymer having an isocyanate content of 24.5% prepared from the polyisocyanate mixture described in Example 1 and dipropylene glycol |
| 7. | 135.5 | parts of the isocyanate semi-prepolymer from Example 7. |

A "polyol component" was prepared by mixing components 1 to 5 and then mixed mechanically with the mixture of components 6 and 7 (polyisocyanate component) for 9 seconds. The raw materials were at a temperature of 25° C. The product was worked up as described in Example 14.

After standing time in the mold of 180 seconds, a molded body having a Shore D hardness of 65, a very high green strength, high rigidity and a smooth, glossy surface was removed from the mold.

Although the invention has been described in detail in the foregoing for the purpose of illustration, it is to be understood that such detail is solely for that purpose and that variations can be made therein by those skilled in the art without departing from the spirit and scope of the invention except as it may be llimited by the claims.

What is claimed is:

1. A polyisocyanate preparation containing urethane groups and having an isocyanate content of about 18 to 285% by weight which is prepared by a process which comprises reacting
    (a) an organic polyisocyanate having aromatically bound isocyanate groups and an isocyanate content of about 30 to 50% by weight or a mixture comprising said organic polyisocyanate, said mixture having an isocyanate content of about 30 to 50% by weight with
    (b) an organic polyhydroxyl compound comprising
    (b1 a polyhydroxypolyacrylate having an average molecular weight, as determined by vapor pressure osmometry, of 232 to about 100,000, optionally containing urethane or ester groups in side chains and containing on statistical average at least one alcoholic hydroxyl group per molecule and
    (b2) up to about 250% by weight, based on b1), of at least one polyhydroxyl compound other than b1) having a molecular weight of 62 to about 12,000, wherein the equivalent ratio of isocyanate groups to hydroxyl groups is at least 1.8:1.

2. The polyisocyanate preparation of claim 1 wherein said polyhydroxypolyacrylate has a molecular weight of about 2000 to 50,000 as determined by vapor pressure osmometry.

3. The polyisocyanate preparation of claim 1 wherein said polyisocyanate preparation additionally contains
    (c) at least one isocyanate inert polymer or copolymer, which has a molecular weight determined by vapor pressure osmometry of about 200 to 50,000, of at least one olefinically unsaturated monomer, said polymer or copolymer being soluble in or compatible with the reaction mixture at room temperature and being used in a total quantity of up to about 250% by weight, based on the weight of component b1).

4. The polyisocyanate preparation of claim 2 wherein said polyisocyanate preparation additionally contains (c) at least one isocyanate inert polymer or copolymer, which has a molecular weight determined by vapor pressure osmometry of about 200 to 50,000, of at least one olefinically unsaturated monomer, said polymer or copolymer being soluble in or compatible with the reaction mixture at room temperature and being used in a total quantity of up to about 250% by weight, based on the weight of component b1).

5. The polyisocyanate preparation of claim 1 wherein said polyisocyanate preparation additionally contains at least one isocyanate inert solvent in a total quantity of up to about 200% by weight, based on component b1).

6. A polyisocyanate preparation containing urethane groups and having an isocyanate content of about 18 to 28% by weight which is prepared by a process which comprises reacting (a) an organic polyisocyanate having aromatically bound isocyanate groups and an isocyanate content of about 30 to 50% by weight or a mixture comprising said organic polyisocyanate, said mixture having an isocyanate content of about 30 to 50% by weight with (b) an organic polyhydroxyl compound comprising (b1) a polyhydroxypolyacrylate having an average molecular weight, as determined by vapor pressure osmometry, of 232 to about 100,000, optionally containing urethane or ester groups in side chains and containing on statistical average at least one alcoholic hydroxyl group per molecule, said polyhydroxypolyacrylate being prepared by polymerizing an ester of $\alpha, \beta$-ethylenically unsaturated acid containing a hydroxyalkyl group or by polymerizing such an ester with another olefinically unsaturated monomer and (b2) up to about 250% by weight, based on b1), of at least one polyhydroxyl compound other than b1) having a molecular weight of 62 to about 12,000, wherein the equivalent ratio of isocyanate groups to hydroxyl groups is at least 1.8:1.

7. The polyisocyanate preparation of claim 6 wherein said polyhydroxypolyacrylate has a molecular weight of about 2000 to 50,000 as determined by vapor pressure osmometry.

8. The polyisocyanate preparation of claim 6 wherein said polyisocyanate preparation additionally contains (c) at least one isocyanate inert polymer or copolymer, which has a molecular weight determined by vapor pressure osmometry of about 200 to 50,000, of at least one olefinically unsaturated monomer, said polymer or copolymer being soluble in or compatible with the reaction mixture at room temperature and being used in a total quantity of up about 250% by weight, base on component b1).

9. The polyisocyanate preparation of claim 7 wherein said polyisocyanate preparation additionally contains (c) at least one isocyanate inert polymer or copolymer, which has a molecular weight determined by vapor pressure osmometry of about 200 to 50,000, of at least one olefinically unsaturated monomer, said polymer or copolymer being soluble in or compatible with the reaction mixture at room temperature and being used in a total quantity of up to about 250% by weight, based on component b1).

10. The polyisocyanate preparation of claim 6 wherein said polyisocyanate preparation additionally contains at least one isocyanate inert solvent in a total quantity of up to about 200% by weight, based on component b1).

11. A process for the preparation of a polyurethane or a polyurethane polyurea in the form of an optionally cellular molded article having a compact surface, which comprises reacting in a closed mold (I) a polyisocyanate preparation containing urethane groups and having an isocyanate content of about 0.5 to 45% by weight which is prepared by a process which comprises reacting (a) an organic polyisocyanate having an isocyanate content of about 30 to 50% by weight or a mixture comprising said organic polyisocyanate, said mixture having an isocyanate content of about 30 to 50% by weight with (b) an organic polyhydroxyl component comprising (b1) a polyhydroxypolyacrylate having an average molecular weight, as determined by vapor pressure osmometry of 232 to about 100,000, optionally containing urethane or ester groups in side chains and containing on statistical average at least one alcoholic hydroxyl group per molecule and (b2) up to about 250% by weight, based on b1), of at least one polyhydroxyl compound other than b1) having a molecular weight of 62 to about 12,000, wherein the equivalent ratio of isocyanate groups to hydroxyl groups is at least about 1.8:1, and (II) an isocyanate-reactive component comprising at least one compound having a molecular weight of 400 to about 12,000 which contains at least two isocyanate-reactive groups and, optionally, at least one compound having a molecular weight of 32 to 399 which contains at least two isocyanate reactive groups.

12. The process of claim 11 wherein said polyhydroxy polyacrylate has a molecular weight of at least about 2000 to 50,000 as determined by vapor pressure osmometry.

13. The process of claim 11 wherein said polyisocyanate preparation additionally contains (c) at least one isocyanate inert polymer or copolymer, which has a molecular weight determined by vapor pressure osmometry of about 200 to 50,000, of at least one olefinically unsaturated monomer, said polymer or copolymer being soluble in or compatible with the reaction mixture at room temperature and being used in a total quantity of up to about 250% by weight, based on component b1).

14. The process of claim 12 wherein said polyisocyanate preparation additionally contains (c) at least one isocyanate inert polymer or copolymer, which has a molecular weight determined by vapor pressure osmometry of about 200 to 50,000, of at least one olefinically unsaturated monomer, said polymer or copolymer being soluble in or compatible with the reaction mixture at room temperature and being used in a total quantity of up to about 250% by weight, based on component b1).

15. The process of claim 11 wherein said polyisocyanate preparation additionally contains at least one isocyanate inert solvent in a total quantity of up to about 200% by weight, based on component b1).

16. The process of claim 11 wherein said polyhydroxypolyacrylate is prepared by polymerizing an ester of an α, β-ethylenically unsaturated acid containing a hydroxyalkyl group or by polymerizing said ester with another olefinically unsaturated monomer.

17. A process for the preparation of a polyurethane or a polyurethane polyurea in the form of an optionally cellular molded article having a compact surface, which comprises reacting in a closed mold (I) a polyisocyanate preparation containing urethane groups and having an isocyanate content of about 18 to 28% by weight which is prepared by a process which comprises reacting
  (a) an organic polyisocyanate having aromatically bound isocyanate groups and an isocyanate content of about 30 to 50% by weight or a mixture comprising said organic polyisocyanate, said mixture having an isocyanate content of about 30 to 50% by weight with
  (b) an organic polyhydroxyl component comprising
  (b1) a polyhydroxypolyacrylate having an average molecular weight, as determined by vapor pressure osmometry of 232 to about 100,000, optionally containing urethane or ester groups in side chains and containing on statistical average at least one alcoholic hydroxyl group per molecule, said polyhydroxy polyacrylate being prepared by polymerizing an ester of α, β-ethylenically unsaturated acid containing a hydroxyalkyl group or copolymerizing such an ester with an olefinically unsaturated monomer and
  (b2) up to about 250% by weight based on b1) of at least one polyhydrroxyl compound other than b1) having a molecular weight of 62 to about 12,000, wherein the equivalent ratio of isocyanate groups to hydroxyl groups is at least 1.8:1, and (II) an isocyanate-reactive component comprising at least one compound having a molecular weight of 400 to about 12,000 which contains at least two isocyanate-reactive groups and, optionally, at least one compound having a molecular weight of 32 to 399 which contains at least two isocyanate reactive groups.

18. The process of claim 17 wherein said the polyhydroxy polyacrylate has a molecular weight of at least about 2000 to 50,000 as determined by vapor pressure osmometry.

19. The process of claim 17 wherein said polyisocyanate preparation additionally contains
  (c) at least one isocyanate inert polymer or copolymer, which has a molecular weight determined by vapor pressure osmometry of about 200 to 50,000, of at least one olefinically unsaturated monomer, said polymer or copolymer being soluble in or compatible with the reaction mixture at room temperature and being used in a total quantity of up to about 250% by weight, being on component b1).

20. The process of claim 18 wherein said polyisocyanate preparation additionally contains
  (c) at least one isocyanate inert polymer or copolymer, which has a molecular weight determined by vapor pressure osmometry of about 200 to 50,000, of at least one olefinically unsaturated monomer, said polymer or copolymer being soluble in or compatible with the reaction mixture at room temperature and being used in a total quantity of up to about 250% by weight, based on component b1).

21. The process of claim 17 wherein said polyisocyanate preparation additionally contains at least one isocyanate inert solvent in a total quantity of up to about 200% by weight, based on component b1).

* * * * *